May 23, 1939.   F. W. HANKS   2,159,892
FLUID METER
Original Filed Feb. 26, 1935
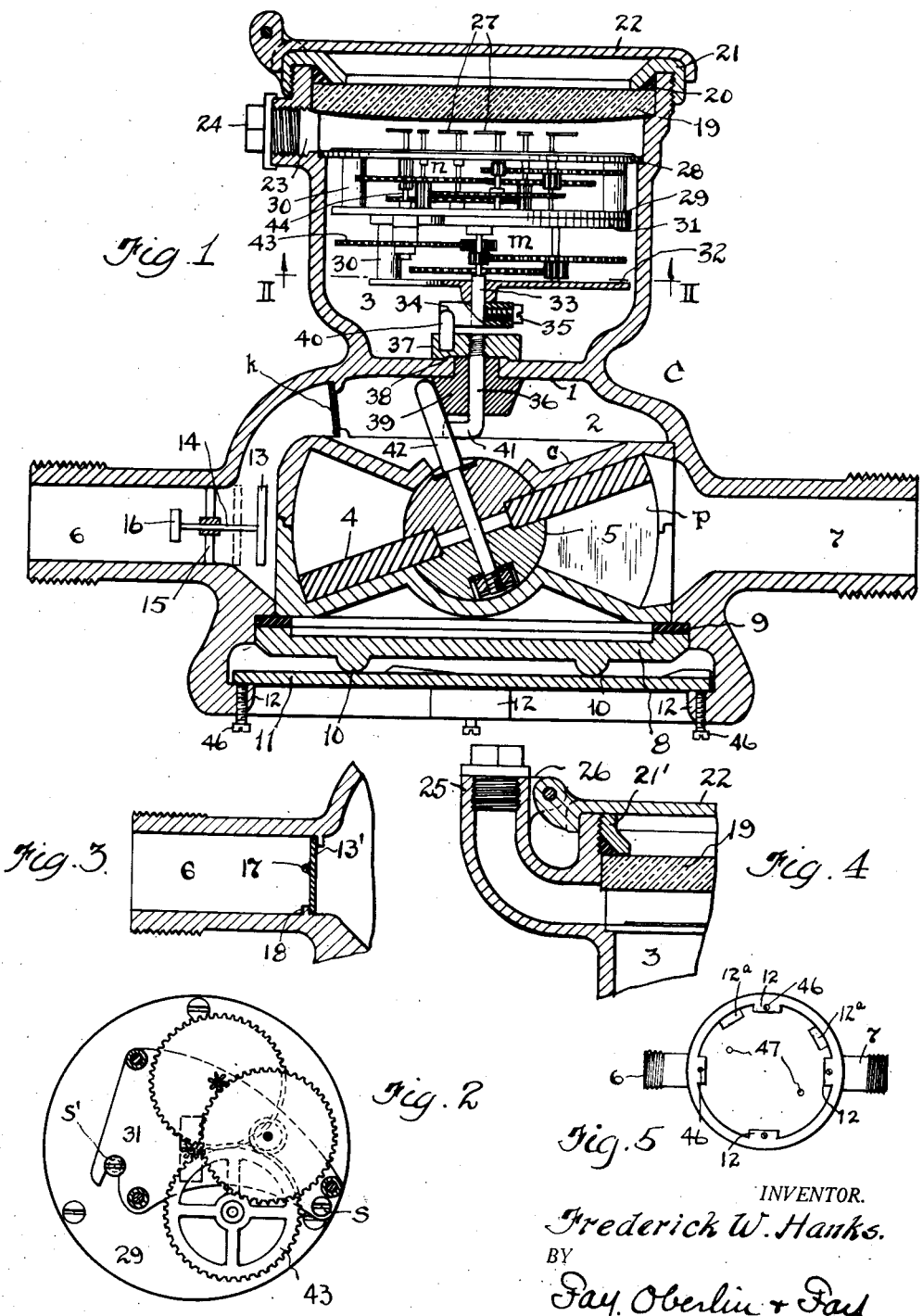
INVENTOR.
Frederick W. Hanks.
BY
Fay, Oberlin + Fay
ATTORNEYS.

Patented May 23, 1939

2,159,892

UNITED STATES PATENT OFFICE 2,159,892

FLUID METER

Frederick W. Hanks, Cleveland, Ohio

Original application February 26, 1935, Serial No. 8,403, which is a division of application Serial No. 660,810, March 15, 1933, now Patent No. 2,029,319, dated February 4, 1936. Divided and this application May 9, 1938, Serial No. 206,831

3 Claims. (Cl. 74—397)

This invention relates to meters, and more particularly meters for measuring water and other liquids, and it is among the objects of the invention to provide improved gearing, favoring durability and adjustment and replacements. Other objects and advantages will appear as the description proceeds.

To the accomplishment of the foregoing and related ends, the invention, then, comprises the means hereinafter fully described, and particularly pointed out in the claims, the following description and the annexed drawing setting forth in detail certain structure embodying the invention, such however, being illustrative of but a few of the various ways in which the principle of the invention may be employed.

In said annexed drawing:—

Fig. 1 is a central longitudinal section of an embodiment of the invention; Fig. 2 is a section taken on a plane indicated by the line II—II, Fig. 1; Figs. 3 and 4 are sectional details; and Fig. 5 is a reduced scale inverse plan view.

Referring more particularly to the drawing, there is shown a casing C having a partition I setting off fluid chambers 2 and 3, an impeller or fluid-impelled element being located in the chamber 2, and indicating gearing mechanism being located in the chamber 3. The fluid-impelled element may vary in its particular detail, but for example may comprise a nutating disk 4 having a spherical bearing center 5 mounted in a suitable case c having an inlet and an outlet for the fluid, the inlet being in communication with the feed connection 6, and the outlet being in communication with the discharge connection 7. A partition p in the impeller-case coacts with the impeller, so as to separate entrance flow from discharge, in a manner well known in the art.

The registering mechanism as an entirety, as indicated is placed in its own chamber, and this ordinarily will have a transparent cover 19, and tight packing may be had by a gasket 20 against which the screw ring 21 engaging the flange of the casing is set down into place.

The registering mechanism includes dials and pointers 27 revolving thereover, the precise number of pointers and dials depending upon the particular service to which the meter is to be applied. These pointers are carried by actuating gearing, the teeth of which are of predetermined ratio in accordance with the indicating to be had, and the gears are mounted in bearing-plates 28, 29, spacing collars 30 and screws therein serving to hold the plates in assembled relation.

The indicating gears are in turn actuated by reduction-gearing comprising pinions and gear wheels mounted between bearing plates 31, 32, and held by similar spacing collars 30 and screws, as in the gear set described. The primary shaft 33 of the reduction-gear set extends through the bearing-plate 32. An arm 34 is secured to such shaft, for instance by a set screw 35. Extending between the chambers 2 and 3 is a shaft 36 suitably secured, as for instance screw-threadedly, to a rotatable cap-disk or the like 37 in the chamber 3, a bearing shoulder 38 serving to engage with and center the disk. In cooperation with the disk 37 is a carrier-bushing 39, surrounding the shaft 36. The element 37 is provided with a pin 40 which is engageable against the arm 34, and the shaft 36 is provided with an arm 41 in the path of a pin 42 projecting from the impeller 4.

As will thus be seen, the fluid to be metered is introduced through the passageway 6, and proceeding through the impeller-case causes the impeller to move, and thence the fluid discharges out through the exit way 7. On movement of the impeller, its pin 42 sweeping around, correspondingly rotates the shaft 36, by engaging its arm 41, and in turn the pin 40 engaging the arm 34 rotates the reduction-gearing shaft 33. From this shaft, the gearing $m$ actuates the gear 43, the shaft 44 of which carries a pinion actuating the gear train $n$ between the plates 28, 29, and correspondingly the pointers 27 are operated.

As a result of my improved construction in the gearing mount, it will be seen that the gear set $m$ can be readily disassembled in toto from the gear set $n$, the screws $ss'$ holding the plate 31 to the plate 29, readily allowing such removal. Gear wheels of different ratios may accordingly very easily be provided, or repairs or renewals may be made. By virtue of the possibility of swinging the plate 31 about the screw $s$, the gearing may be unmeshed and the dial setting may be corrected as desired, or again in the case of wear the extent of meshing onto the gear 43 may be adjusted, as desired, and the entire assemblage then be set by tightening up the screw $s'$ in the slot-recess in plate 31.

It will thus be seen that a construction is secured affording reliability and uniformity of operation even under adverse conditions, and allowing of ready access to the different portions of the mechanism for adjustment or repairs.

This application is a division of my prior application Serial No. 8,403, filed Feb. 26, 1935, which in turn is a division of application Serial No. 660,810, filed March 15, 1933, now Patent No. 2,029,319, issued Feb. 4, 1936.

Other modes of applying the principle of the invention may be employed instead of the details disclosed, change being made as regards such details provided the means stated in any of the following claims, or the equivalent of such, be employed.

I therefore particularly point out and distinctly claim as my invention:

1. In a fluid meter reduction gearing adapted to be actuated by a fluid-impelled element, bearing plates between which said gearing is supported, proportioning gearing adapted to actuate register pointers on predetermined ratio, bearing plates between which the latter gearing is supported, and means for securing the reduction gearing in operating relation with the proportioning gearing with one plate of the first mentioned bearing plates adjacent one plate of the second mentioned bearing plates, said means including two screws connecting adjacent plates, one of said screws being a pivot point for one of said adjacent plates and the other screw being an adjustment setting means.

2. In a fluid meter reduction gearing adapted to be actuated by a fluid-impelled element, bearing plates between which said gearing is supported, proportioning gearing adapted to actuate register pointers on predetermined ratio, bearing plates between which the latter gearing is supported, and means in common for permitting regulating the distance between meshing gear elements of the said respective gearing and for securing the reduction gearing in operating relation with the proportioning gearing with one plate of the first mentioned bearing plates adjacent one plate of the second mentioned bearing plates, said means including screws connecting the adjacent plates, one of said screws extending through a slot recess in an edge of the adjacent plate sustaining the reduction gearing.

3. In a fluid meter gearing adapted to be placed between a fluid-impelled element and register indicating means therefor, separate gear sets including an indicator gear set and a reducing gear set, a mounting for each said gear set comprising spaced apart plates receiving the gears and their shafts in between, one of said plates of the indicator gear set being back to back against one of the plates of the reducing gear set, and means for permitting taking up wear between the gear sets, said means including a gear on a shaft projecting from the indicator gear set into the reducing gear set and means for permitting adjusting the reducing gear meshing with said gear, including a pivot connecting said back to back plates near one edge whereby the plate carrying the reducing gear may be moved and the reducing gear in mesh with said gear on the shaft from the indicator gear set may be arcuately adjusted, and means for holding the said movable plates in such position.

FREDERICK W. HANKS.